United States Patent [19]

Kendall

[11] 4,360,037
[45] Nov. 23, 1982

[54] SELF-CLEANING FILTER ASSEMBLY FOR SOLENOID-ACTUATED VALVE

[75] Inventor: Giles A. Kendall, Glendora, Calif.

[73] Assignee: Anthony Manufacturing Corp., Azusa, Calif.

[21] Appl. No.: 222,485

[22] Filed: Jan. 5, 1981

[51] Int. Cl.³ .................... B08B 1/00; F16K 31/02; F16L 55/24

[52] U.S. Cl. .................. 137/242; 137/549; 210/390; 210/413; 251/30

[58] Field of Search .............. 137/547, 549, 242, 244; 251/25, 28, 30, 46; 210/390, 395, 396, 413

[56] References Cited

U.S. PATENT DOCUMENTS

| | | | |
|---|---|---|---|
| 1,199,350 | 9/1916 | Collin | 137/244 |
| 2,532,568 | 12/1950 | Myers | 137/547 |
| 2,573,369 | 10/1951 | Snoddy | 251/30 |
| 2,606,663 | 8/1952 | Blackman et al. | 210/413 |
| 4,081,171 | 3/1978 | Morgan et al. | 251/30 |

*Primary Examiner*—George L. Walton
*Attorney, Agent, or Firm*—Fulwider, Patton, Rieber, Lee & Utecht

[57] ABSTRACT

An improved self-cleaning filter assembly for use in a solenoid-actuated valve of the type having a fluid pressure-operated diaphragm to control opening and closing of the valve. Control fluid under pressure is admitted from an inlet chamber of the valve into a control chamber at one side of the diaphragm to maintain the valve in a closed position, and this fluid pressure in the control chamber is relieved by actuation of a solenoid to open the valve. The self-cleaning filter assembly comprises a relatively rigid filter element for filtering the control fluid and a plurality of scraper blades mounted for scraping dirt, grit, or the like from the filter element each time the valve is opened or closed.

36 Claims, 8 Drawing Figures

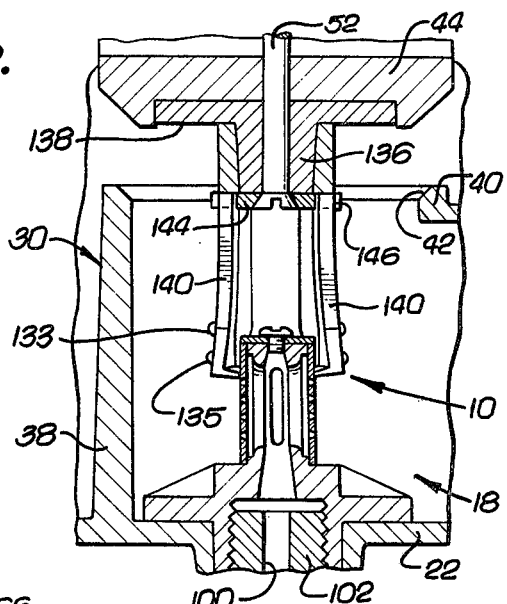
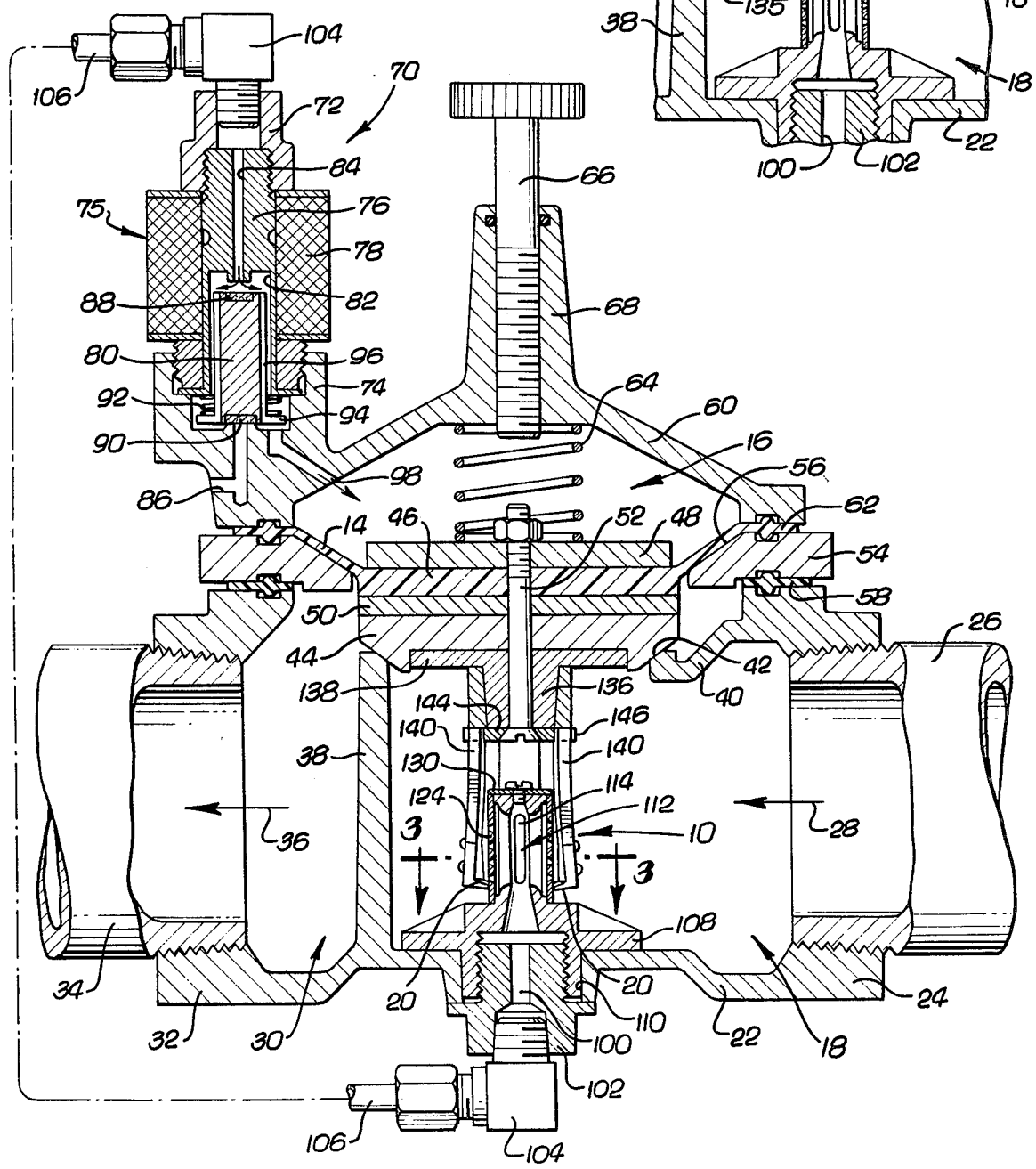

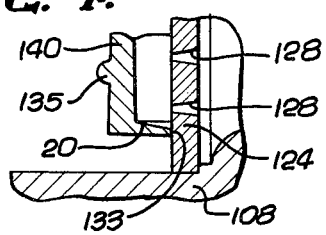
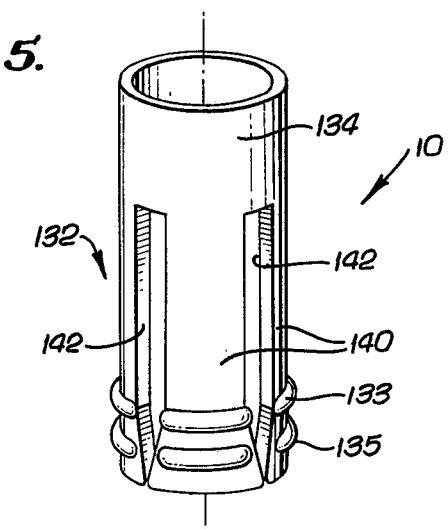
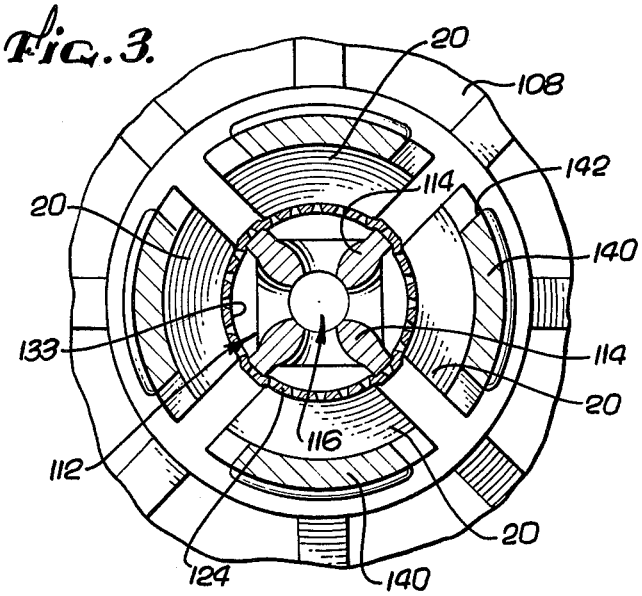
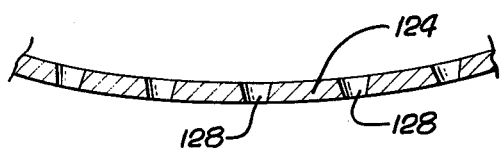
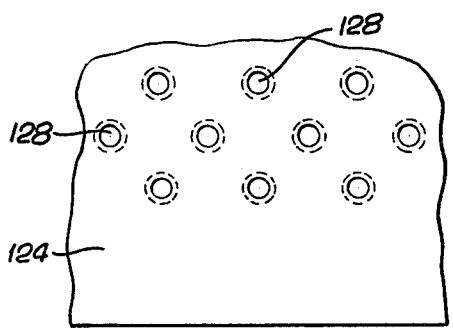
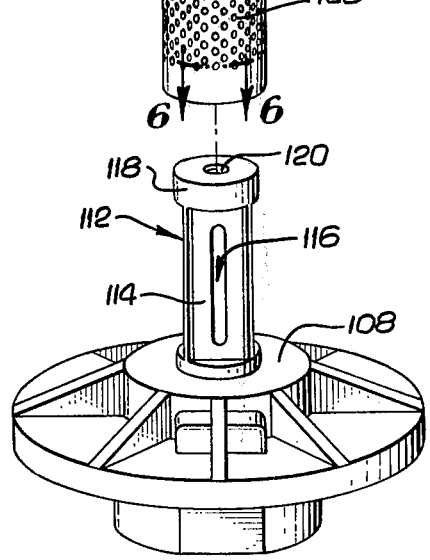

SELF-CLEANING FILTER ASSEMBLY FOR SOLENOID-ACTUATED VALVE

BACKGROUND OF THE INVENTION

This invention relates to a self-cleaning filter assembly for use in a solenoid-actuated valve of the type having a fluid pressure-operated diaphragm to control opening and closing of the valve. More specifically, the self-cleaning filter assembly of this invention comprises an improvement over the self-cleaning filter assembly disclosed and claimed in U.S. Pat. No. 4,081,171.

In U.S. Pat. No. 4,081,171, a self-cleaning filter assembly is disclosed for filtering control fluid in a solenoid-actuated valve including a pressure-responsive diaphragm movable to open and close the valve. This filter assembly comprises a filter element of mesh screen for filtering dirt, grit, and the like from the control fluid, and a brush for sweeping accumulated filtered matter from the filter element. The filter element and the brush are mounted for movement relative to each other, and one of the filter element and the brush is movable with the diaphragm whereby the brush sweeps the surface of the filter element each time the valve is opened or closed.

The filter assembly set forth in U.S. Pat. No. 4,081,171, however, includes a variety of disadvantages which have limited its commercial utility. For example, the bristles of the brush are capable of engaging only a relatively small total surface area of the mesh screen filter element, resulting in an inability of the brush to remove thoroughly the filtered matter from the filter element. This relatively low cleaning effectiveness of the brush is further reduced by a tendency of the bristles and the mesh screen filter element to flex away from each other as filtered matter builds up on the surface of the filter element. Moreover, the mesh screen filter element is formed from a woven network of small wires to define a plurality of filter openings each having an initially converging cross section. Small particles of dirt or grit can therefore be forced by the brush into the converging openings to become trapped therein, and once trapped, the flexible bristles on the brush are incapable of dislodging the particles to unclog the filter element either by sweeping them free or by forcing them through the filter openings. Still further, the brush bristles tend to become caught in these filter openings, or alternately, to deflect to a set position with substantially reduced cleaning engagement with the filter element. When the filter assembly is used for filtering water, both the brush and the woven-textured filter element provide a large number of small cavities highly susceptible to growth of algae, resulting in a sliming over of both the brush and the filter element.

The present invention overcomes the problems and disadvantages of the prior art by providing an improved self-cleaning filter assembly for use with solenoid-actuated valves. The invention includes an improved filter element in cooperation with an improved cleaning element to provide a self-cleaning filter assembly for thoroughly cleaning filterd matter from the filter element and which is not susceptible to clogging or to the growth of algae.

SUMMARY OF THE INVENTION

In accordance with the invention, a self-cleaning filter assembly is provided for filtering control fluid in a solenoid-actuated valve including a diaphragm responsive to pressure of the control fluid within a control chamber to open and close a flow path through the valve. The self-cleaning filter assembly comprises a filter element in the form of a relatively rigid cylindrical filter sleeve having a plurality of relatively small filtering flow paths. This filter sleeve is installed generally at an inlet side of the solenoid-actuated valve, and allows passage of a relatively small portion of the water at the valve inlet into relatively small passageways leading to a control chamber, whereby the portion of the water comprises the control fluid for controlling operation of a valve diaphragm. A plurality of relatively rigid scraper blades are urged under spring force into scraping contact with the upstream surface of the filter sleeve to scrape grit or other accumulated deleterious material from the filter sleeve each time the valve is opened or closed.

In one embodiment of the invention, the filter sleeve is carried by a filter support secured to the valve in a fixed position within the valve inlet. The scraper blades are mounted for movement with the valve diaphragm in scraping communication with the filter sleeve, whereby accumulated matter is scraped from the filter sleeve each time the valve is opened or closed by movement of the diaphragm. In another embodiment of the invention, the filter support is connected to the valve diaphragm for movement of the filter sleeve each time the valve is opened and closed. The scraper blades are mounted in a fixed position with respect to the valve in scraping communication with the filter sleeve. In this latter embodiment, each time the diaphragm is moved to open or close the valve, the filter sleeve is translated within the scraper blades for removal of accumulated matter from the filter element. In either embodiment, the filtering flow paths in the filter element are tapered to diverge in the direction of fluid flow so that grit or the like small enough to enter the filtering flow paths will be forced through by the scraper blades to prevent clogging of the flow paths.

These and other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a fragmented cross sectional view of a solenoid-actuated valve included a self-cleaning filter assembly of this invention;

FIG. 2 is an enlarged fragmented cross sectional view of a portion of the filter assembly shown in FIG. 1, and showing the assembly in a second position of operation;

FIG. 3 is an enlarged fragmented vertical section taken generally on the line 3—3 of FIG. 1;

FIG. 4 is an enlarged fragmented vertical section illustrating a portion of the filter assembly;

FIG. 5 is an exploded perspective view illustrating the filter assembly of this invention;

FIG. 6 is an enlarged fragmented vertical section taken generally on the line 6—6 of FIG. 5;

FIG. 7 is an enlarged fragmented elevation view of a portion of a filter sleeve for use in the filter assembly of this invention.

DETAILED DESCRIPTION OF THE PREFERRED EMBODIMENT

Figure 8:
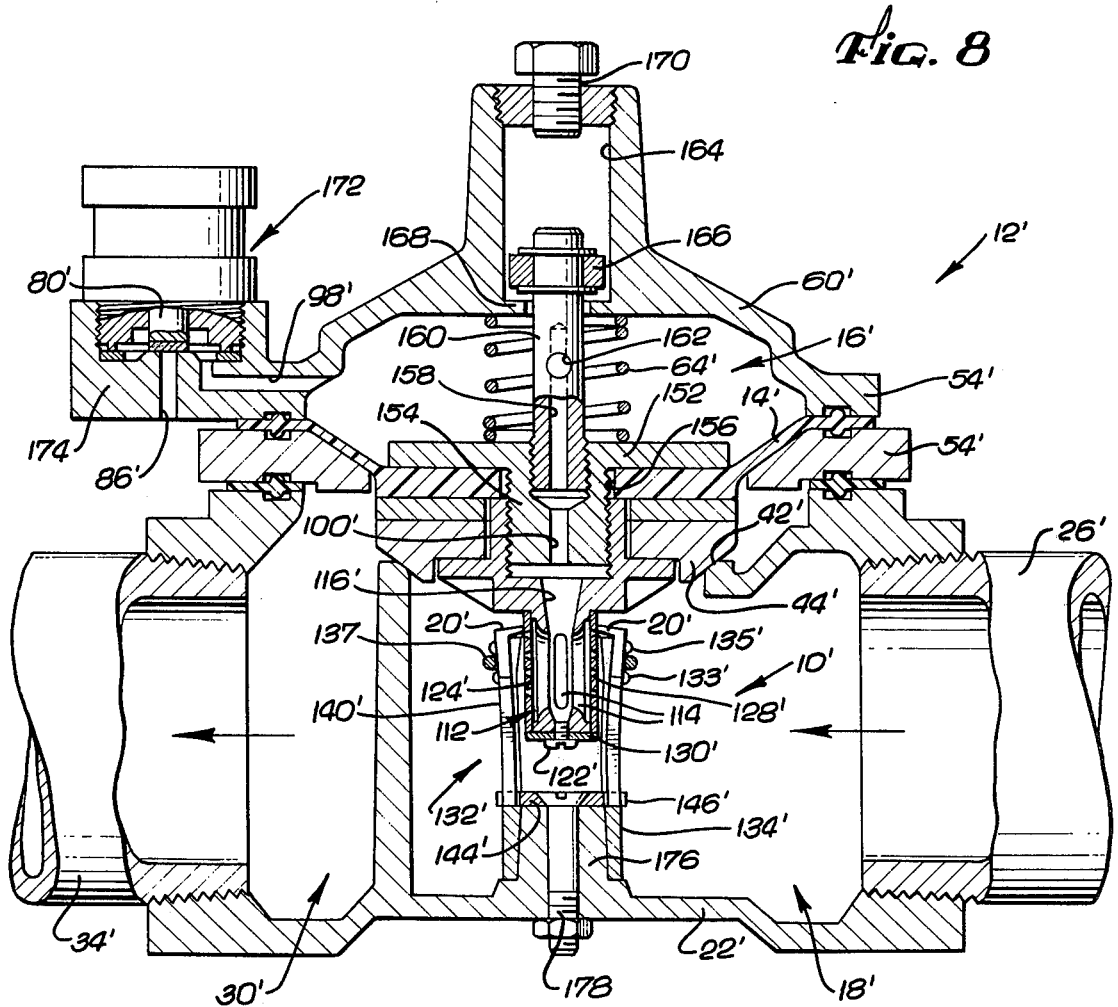
FIG. 8 is an enlarged fragmented cross sectional view of a solenoid-actuated valve including an alternate mounting arrangement for the filter assembly of this invention.

As illustrated in the exemplary drawings, the present invention is embodied in a self-cleaning filter assembly 10 for use in a solenoid-actuated valve 12 of the type having a diaphragm 14 to control opening and closing of the valve in response to the pressure of control fluid within a control chamber 16. The control fluid comprises a relatively small portion of the fluid at an inlet side or inlet chamber 18 of the valve, and this control fluid is filtered by the filter assembly 10 prior to passage to the control chamber 16. According to the invention, the filter assembly 10 includes a cleaning element having relatively rigid scraper blades 20 which operate to remove accumulated dirt, grit, or other deleterious matter from a relatively rigid filter element each time the valve is opened or closed.

The self-cleaning filter assembly 10 of this invention comprises a substantial improvement over the prior art in that the control fluid is consistently filtered over a long period of time without danger of clogging the filter assembly or of a reduction in filtering effectiveness. More specifically, the self-cleaning filter assembly 10 of this invention comprises a substantial improvement over the brush and mesh screen filter assembly set forth in U.S. Pat. No. 4,081,171. In particular, the rigid scraper blades 20 cooperate with the rigid filter element for relatively large surface area scraping contact therebetween to remove substantially all accumulated filtered matter from the filter element each time the valve is opened or closed. The scraper blades and the filter element do not flex with respect to each other, but instead the scraper blades are maintained by spring members in scraping engagement with the filter element. Moreover, the surface geometries of the scraper blades and the filter element are not susceptible to trapping of dirt or grit, or to the growth of algae, and the filter openings in the filter element are shaped to allow particulate small enough to enter the openings to be forced on through by the rigid scraper blades. Accordingly, the filter assembly 10 of this invention is well suited for filtering a fluid such as water when the valve is used for controlling supply of irrigation water to a sprinkler system.

As illustrated in FIG. 1, the self-cleaning filter assembly 10 of this invention is adapted for use in the solenoid-actuated valve 12 which is described herein for purposes of aiding in the understanding of the invention. This valve 12 includes a valve housing 22 formed from a suitable rigid structural material such as brass, plastic, or the like. The valve housing 22 is shaped to define an inlet end 24 for threaded reception of an inlet conduit 26 for supplying a fluid such as water in the direction of arrow 28 to the inlet chamber 18 of the valve. The valve housing 22 also includes an outlet chamber 30 for communicating with the inlet chamber 18 when the valve is in an open position, as will be described. This outlet chamber 30 is positioned at an outlet end 32 of the valve housing adapted for threaded reception of an outlet conduit 34 for passage of the fluid from the valve in the direction of arrow 36.

An upstanding arcuate wall 38 blocks the straight line flow path between the valve inlet chamber 18 and the outlet chamber 30. This upstanding arcuate wall cooperates with an upper side wall 40 to define a continuous annular valve seat 42. This valve seat 42 cooperates with a valve disk 44 carried by the diaphragm 14 for opening and closing of the valve. More specifically, with the valve disk 44 in a seated position upon the valve seat 42, as shown in FIG. 1, flow communication between the valve inlet and outlet chambers 18 and 30 is prevented whereby the valve 12 is closed. However, when the valve disk 44 is lifted from the valve seat 42, as shown in FIG. 2, the fluid is free to pass from the valve inlet chamber 18 past the valve seat 42 to the outlet chamber 30.

The valve disk 44 can be conveniently formed from a resilient material, such as a natural or synthetic elastomer, for sealing engagement with the valve seat 42. As illustrated in FIG. 1, this valve disk 44 is carried by a thickened central portion 46 of the diaphragm 14 wherein a pair of reinforcement plates 48 and 50 are clamped on opposite sides of the thickened diaphragm central portion for reinforcement thereof. The valve disk 44 is in turn positioned on the lower face of the lower reinforcement plate 50, and a clamping bolt 52 is passed through the valve disk 44 and the plates 48 and 50 to clamp the entire subassembly onto the diaphragm 14.

The diaphragm 14 is formed from a suitable flexible material such as a synthetic elastomer, and extends radially outwardly from the thickened central portion 46 to close the upper portion of the outlet chamber 30 above the valve seat 42. Conveniently, the diaphragm 14 rests, when the valve is closed as shown in FIG. 1, upon an annular support ring 54 including a tapered annular surface 56 for supporting the diaphragm 14. This support ring 54 is mounted on the valve housing 22 with an appropriate beaded annular seal 58 interposed therebetween to prevent water leakage. A valve bonnet 60 is in turn positioned over the diaphragm 14 and cooperates with the support ring 54 to trap a beaded annular periphery 62 of the diaphragm between the support ring 54 and the bonnet 60. The bonnet 60 and the support ring 54 are together secured to the underlying valve housing 22 by appropriate connection means such as bolts (not shown).

The bonnet 60 has a generally dome-shaped geometry which cooperates with the diaphragm 14 to define the control chamber 16. A compression spring 64 reacts between the bonnet 60 and the diaphragm 14 at the upper reinforcement plate 48 to apply a downwardly directed spring force to the diaphragm 14. This spring force urges the diaphragm 14 to move the valve disk 44 toward a normally closed position upon the valve seat 42. Conveniently, a manually operated handle 66 is threadably received within a boss 68 in the bonnet 60 for vertical translation along its axis through the control chamber 16 into engagement with the bolt 52 carried by the diaphragm 14. The handle 66 can thus be moved to displace the valve disk 44 to a closed position seated upon the valve seat 42. Alternately, if desired, the handle 66 can be adjusted to select the degree of opening of the valve disk 44 by controlling the magnitude of allowable displacement of the diaphragm 14 in response to control pressures, as will be described in more detail.

A solenoid valve assembly 70 is mounted on the bonnet 60 for controlling supply of the control fluid under pressure to the control chamber 16. More specifically, the solenoid valve assembly 70 includes a solenoid housing 72 which is threadably secured into a mounting boss 74 formed integrally with the bonnet 60. This solenoid housing 72 supports a solenoid 75 including a stationary solenoid core 76 surrounded by an electrical coil 78 adapted for connection to an appropriate source (not shown) of electrical current.

A cylindrical valve plug 80 is received within the solenoid housing 72 for axially sliding movement between a pair of positions in response to energization of the solenoid 75. As shown, this valve plug 80 is received into a bore 82 at one end of the solenoid core 76 between a control fluid supply passageway 84 in the core 76 and a control fluid bleed port 86 opening to atmosphere. Valve disks 88 and 90 are respectively carried by the opposite ends of the plug 80 for closing one or the other of the passageways 84 or the bleed port 86.

When the solenoid 75 is not energized, a small compression spring 92 reacts between the end of the solenoid core 76 and a flange 94 on the plug 80 to move the plug to a normal position seated over the bleed port 86. In this position, the plug 80 is retracted from the control fluid supply passageway 84 to allow flow of the control fluid axially along the plug 80 through slots 96 and further into the control chamber 16 of the valve 12 via a control fluid port 98. Control fluid under pressure is thus communicated to the control chamber 16, and this pressure is sufficient when combined with the force of the compression spring 64 to move the diaphragm 14 and the valve disk 44 to the closed or seated position shown in FIG. 1.

When the solenoid 75 is energized, the plug 80 is retracted by the solenoid core 76 to a position seated over the control fluid passageway 84 thereby opening the bleed port 86. Importantly, the bleed port 90 is in communication with the control fluid port 98 to allow the fluid pressure in the control chamber 16 to be relieved to atmosphere. When this occurs, the pressure of the fluid in the inlet chamber 18 of the valve overcomes the force of the compression spring 64 to lift the diaphragm 14 and the valve disk 44 to an open position as illustrated in FIG. 2. Accordingly, the valve 12 is opened and closed in response to the supply of pressurized control fluid to the control chamber 16 as governed by energization of the solenoid 75.

The control fluid supplied to the solenoid valve assembly 70 conveniently comprises a relatively small portion of the fluid under pressure at the inlet chamber 18 of the valve 12. This control fluid is bled from the inlet chamber 18 through a control fluid orifice 100 into a fitting 102 at the bottom of the valve housing 22. The control fluid is in turn communicated from the fitting 102 through appropriate connectors 104 and a conduit 106 to the solenoid housing 72, and further to the control fluid passageway 84 in the solenoid core 76.

According to the invention, the self-cleaning filter assembly 10 of this invention is provided for filtering the control fluid prior to passage of the fluid through the orifice 100 for flow to the solenoid valve assembly 70. Accordingly, the filter assembly 10 is positioned within the valve inlet chamber 18 and functions to filter dirt, grit, and other deleterious or particulate material from the control fluid. In this manner, the filter assembly 10 of this invention prevents clogging of the relatively small fluid passageways leading through the solenoid valve assembly 70 and into the control chamber 16 to assure trouble-free valve operation over a long period of time. Importantly, the filter assembly 10 includes means for cleaning accumulated filtered matter from the assembly each and every time the valve is operated.

As shown in FIGS. 1–5, the self-cleaning filter assembly 10 comprises a flanged base 108 at the bottom of the valve inlet chamber 18, and this base is configured for threaded engagement with the fitting 102 through an opening 110 in the valve housing 22. The base 108 is formed integrally with an upstanding filter support 112 which, in the preferred embodiment, comprises a plurality of upstanding posts 114 spaced from each other and arranged to define a central downwardly opening flow passage 116 communicating with the orifice 100. The upper ends of these posts 114 are secured by a common disk 118 including a central hole 120 for reception of a screw 122.

The filter element for the filter assembly 10 is provided in the form of a relatively rigid sleeve 124 formed from a welded stainless steel tube or the like sized to slide over the filter support 112 to encircle the upstanding posts 114. The sleeve 124 defines a relatively smooth surface exterior interrupted only by a plurality of relatively small filter openings 128 for admission of fluid from the inlet chamber 18 into the flow passage 116 defined by the posts 114. A washer 130 is positioned over the upper end of the filter sleeve 124 and the disk 118, and the screw 122 is secured through the washer 130 into the disk 118 to retain the filter sleeve 124 in the desired position.

As shown in detail in FIGS. 6 and 7, the small filter openings 128 in the filter sleeve 124 are tapered to diverge in the direction of fluid flow. More specifically, these openings 128 expand in size from the exterior surface of the sleeve 124 in a direction toward the interior surface of the sleeve. With this geometry, dirt, grit, and other particulate matter small enough in size to enter the filter openings 128 will thus pass on through the openings and will not clog or otherwise obstruct water flow therethrough.

A cleaning element 132 is carried for movement with the diaphragm 14 and includes the relatively rigid scraper blades 20 in scraping engagement with the smooth-surface exterior of the rigid filter sleeve 124. This cleaning element 132 includes an upper mounting cylinder 134 sized for relatively snug engagement about a mounting stud 136 depending centrally from a support disk 138 at the underside of the valve disk 44. A plurality of radially spaced spring arms 140 extend axially downwardly from the mounting cylinder 134 to define axially extending slots 142 between the arms 140. A washer 144 includes radial legs 146 for reception into these slots 142, as viewed in FIGS. 1 and 2, and the connecting bolt 52 described previously also passes upwardly through this washer 142 and the mounting stud 136 to secure the cleaning element 132 for reciprocal movement in a vertical direction with the diaphragm 14.

The cleaning element 132 is formed preferably from a relatively lightweight plastic material, such as Delrin, whereby the spring arms 140 extending downwardly from the mounting cylinder 134 are springably movable in a radial direction with respect to the axis of the cylinder 134. The free ends of these spring arms 140 include the scraper blades 20 which extend radially inwardly toward the filter screen 124. These scraper blades are each tapered slightly in thickness as illustrated best in FIG. 4 to a substantially pointed scraper edge 133 shaped to engage an arcuate portion of the filter sleeve 124, as illustrated in FIG. 3. The plurality of scraper blades 20 combine with each other to scrape substantially a full circle about the filter sleeve 124 whereby the blades 20 are capable of scraping substantially the entire exterior surface of the filter element. As shown in FIGS. 1 and 2, the radial length of these scraper blades is sufficient to deflect the lower ends of the spring arms 140 in a radially outward direction so that each scraper blade 20 is urged by its associated spring arm 140 into scraping engagement with the filter sleeve 124. If desired, a resilient ring such as an O-ring can be provided to encircle the lower ends of the spring arms 140 between upper and lower flanges 133 and 135 to increase the spring force applied to the scraper blades 20.

In operation of the valve 12, the solenoid 75 is maintained in a deenergized state to allow the control chamber 16 to fill with pressurized control fluid to maintain the valve disk 44 in a closed position. This control fluid is, of course, filtered by the filter assembly 10 to remove grit and the like therefrom. When the solenoid 75 is energized as described above, the pressure in the control chamber 16 is relieved to allow the valve disk 44 to move with the diaphragm 14 to an open position. Such movement of the valve disk 44 and the diaphragm carries the cleaning element 132 in an upward direction as viewed in FIG. 1 with the rigid scraper blades 20 scraping the exterior surface of the rigid filter sleeve 124 to remove accumulated filtered matter therefrom. The blades 20 and the filter sleeve 124 do not flex away from each other so that substantially the entire exterior surface of the sleeve 124 is scraped clean of the filtered matter. This removed accumulated matter is carried by the fluid flowing through the now-open valve to the outlet chamber 30 and further out of the valve 12 through the outlet conduit 34. Any particles of the filtered matter small enough to enter the filter openings 128 in the sleeve 124 are forced on through the diverging openings 128 by the rigid blades 20 to prevent clogging of the openings.

In a similar manner, when the solenoid 75 is once again deenergized, the valve disk 44 and the diaphragm 14 return to their closed positions. This carries the cleaning element 132 in a reverse or downward direction as viewed in FIG. 1 once again to scrape accumulated filtered matter from the filter sleeve 124. Accordingly, the cleaning element 132 scrapes the filter sleeve 124 each time the valve 12 is opened or closed.

A modified embodiment of the invention is shown in FIG. 8, wherein primed reference numerals are used where appropriate to indicate structure in common with that shown with respect to FIGS. 1–7. In this embodiment, a self-cleaning filter assembly 10′ comprises a cleaning element 132′ secured to a valve housing 22′ of a solenoid-actuated valve 12′, and a relatively rigid filter sleeve 124′ is carried for movement with a pressure-operated diaphragm 14′. The cleaning element 132′ and the filter sleeve 124′ cooperate such that the filter sleeve 124′ translates within the cleaning element 132′ for scraping by relatively rigid scraper blades 20′ each time the valve 12′ is opened or closed.

The valve 12′ comprises the valve housing 22′ including an inlet chamber 18′ and an outlet chamber 30′ for respective coupling to an inlet conduit 26′ and an outlet conduit 34′. A valve seat 42′ is located between the inlet and outlet chambers 18′ and 30′ for seated reception of a valve disk 44′ carried by the diaphragm 14′. As in the previous embodiment, the valve disk 44′ and the diaphragm 14′ are mounted on the valve housing 22′ by means of an annular support ring 54′ and a bonnet 60′. The bonnet 60′ cooperates with the diaphragm 14′ to define an upper control chamber 16′, and a compression spring 64′ within this control chamber 16′ reacts between the bonnet 60′ and the diaphragm to apply a spring force to the diaphragm urging the valve disk 44′ to a seated position upon the valve seat 42′.

Control fluid is supplied from the inlet chamber 18′ of the valve 12′ to the control chamber 16′ via a control fluid flow path communicating the inlet and control chambers 18′ and 16′ through the diaphragm 14′. More specifically, as viewed in FIGS. 8, a fitting 152 includes a threaded boss 154 received downwardly through a central opening 156 in the diaphragm 14. This fitting 152 includes a control fluid orifice 100′ for passage of control fluid from the inlet chamber 18′ upwardly into the central bore 158 of a vertically extending valve stem 160 within the control chamber 16′. This bore 158 opens into the control chamber 16′ via a port 162. As illustrated, the stem 160 is movable along its axis according to movement of the diaphragm 14′ and within the limits imposed by a guide bore 164 formed within the bonnet 60′. In particular, the stem 160 carries an axially fixed stop ring 166 within the guide bore 164 for engagement with axial limit stops defined by a lower flange 168 and an upper adjustable set screw 170.

A modified solenoid valve assembly 172 is secured threadably into a boss 174 on the bonnet for selectively communicating the control fluid in the control chamber 16′ to atmosphere via a control fluid port 98′ and a bleed port 86′. This solenoid valve assembly includes a core and a coil (not shown) for moving a valve plug 80′ from a normally seated position over the bleed port 86′ to a position retracted from the bleed port when the solenoid valve assembly is energized.

In operation of the valve 12′, the control fluid is communicated through the orifice 100′ and the valve stem 160 to the control chamber 16′. With the solenoid valve assembly 172 deenergized, the passage or relieving of the control fluid to atmosphere is prevented. The pressure of the control fluid within the control chamber 16′ thus combines with the force of the spring 64′ to move the diaphragm 14′ and the valve disk 44′ to the closed position. However, when the solenoid valve assembly 172 is energized, the valve plug 80′ is retracted to communicate the control chamber 16′ to atmosphere thereby to relieve the fluid pressure therein. The spring force is overcome by the fluid pressure within the inlet chamber 18′, and this fluid pressure acts to lift the diaphragm 14′ and the valve disk 44′ to an open position.

The self-cleaning filter assembly 10′ is provided in the embodiment of FIG. 8 for filtering dirt, grit, and the like from the control fluid prior to passage into the control fluid orifice 100′. The filter assembly 10′ comprises a flanged base 108′ identical to the embodiment of FIGS. 1–7 including the filter support 112′ in the form of posts 114′ defining a passage 116′ communicating with the orifice 100′. The filter sleeve 124′ with diverging filter openings 128′ is secured over the filter support 112′ by a washer 130′ and a screw 122′, and the base 108′ threadably receives the fitting 152 through the central opening 156 in the diaphragm 14′. Thus, the base 108′ and the fitting 152 together clamp the valve disk 44′ on the diaphragm 14′ and provide structure for centrally reinforcing the diaphragm.

The cleaning element 132′ is identical to the cleaning element 132 of FIGS. 1–7, and includes a mounting cylinder 134′ secured about a mounting stud 176 formed integrally with the valve housing 22′ at the bottom of the inlet chamber 18′. As shown, the mounting cylinder 134′ is secured in place by a bolt 178 passing through the stud 176 and a washer 144′ including radial legs 146′.

A plurality of spring arms 140' extend upwardly from the mounting cylinder 134' to surround the filter sleeve 124' carried by the diaphragm 14'. The upper ends of these spring arms 140' include spaced external flanges 133' and 135' for reception of a resilient ring 137 to urge the arms 140' radially inwardly toward the filter sleeve 124'. The scraper blades 20' at the upper ends of the arms 140' are thus forced into scraping engagement with the rigid filter sleeve 124'. Accordingly, when the valve 12' is opened and closed by control of the solenoid valve assembly 172, as described above, the filter sleeve 124' translates by movement of the diaphragm 14' in scraping engagement with the scraper blades 20' for removal of accumulated filtered matter from substantially the entire exterior surface of the filter sleeve. Any dirt or grit small enough to enter the deverging openings 128' of the filter sleeve 124' is forced on through the openings by the rigid scarper blades 20'.

The self-cleaning filter assembly of this invention thus provides a relatively rigid filter element in the form of a filter sleeve for cooperation with a cleaning element including a spring-biased plurality of relatively rigid scraper blades. The filter sleeve and the scraper blades are positioned in a diaphragm-operated, solenoid-actuated valve for movement relative to each other such that the scraper blades scrape dirt, grit, and other deleterious matter from the filter element each time the valve is opened or closed. According to the invention, substantially the entire exterior surface of the filter sleeve is scraped free of accumulated filtered matter by the blades each time the valve is opened or closed. The filter sleeve and the blades do not flex away from each other, but instead, the blades are maintained under spring force in scraping engagement with the filter sleeve. The rigid scraper blades are not susceptible to becoming caught in the filter openings in the sleeve, nor are the blades subject to flexing to a set position away from scraping engagement with the filter sleeve. Moreover, both the blades and the filter sleeve are configured to avoid entrapment of small particulate or the growth of algae. Any particulate small enough to enter the filter openings in the filter sleeve is forced on through these diverging openings by the rigid scraper blades.

Various modifications and improvements to the self-cleaning filter assembly of this invention are believed to be apparent to one skilled in the art. Accordingly, no limitation upon the invention is intended, except as set forth in the appended claims.

What is claimed is:

1. In a solenoid-actuated valve of the type including an inlet chamber and an outlet chamber, a diaphragm operated by fluid pressure for opening and closing a valve between the inlet and outlet chambers, a control chamber for receiving control fluid from the inlet chamber, and a solenoid for controlling the fluid pressure in the control chamber so that in one condition of the solenoid, fluid pressure within the control chamber acts on the diaphragm to maintain the valve in a closed position, and in another condition relieves the fluid pressure within the control chamber to permit the diaphragm to deflect into the control chamber to move the valve to an open position, the improvement comprising:
 a self-cleaning filter assembly disposed in the inlet chamber of the valve, said filter assembly including a filter element through which control fluid from the inlet chamber must flow to the control chamber, and a cleaning element including at least one scraper blade and scrapper blade arm having sufficient deflection for urging said scraper blade into engagement with said filter element, said cleaning element and said filter element being movable one relative to the other, and one of said cleaning element and said filter element being coupled for movement with the diaphragm so that upon movement of the diaphragm for opening and closing the valve, said scraper blade scrapes said filter element to remove filtered matter accumulated on said filter element.

2. The improvement as defined in claim 1 wherein the deleterious filtered matter removed from said filter element is carried out of the valve from the inlet chamber to the outlet chamber by normal flow through the valve when the valve is in the open position.

3. The improvement as defined in claim 1 wherein said filter element is generally cylindrical in shape, and wherein said cleaning element is positioned to surround said filter element.

4. The improvement as defined in claim 3 wherein said at least one scraper blade substantially surrounds said filter element.

5. The improvement as defined in claim 4 wherein said at least one scraper blade comprises a plurality of scraper blades together substantially surrounding said filter element.

6. The improvement as defined in claim 1 wherein said filter element is stationarily mounted within the inlet chamber of the valve, and said cleaning element is coupled with the diaphragm for movement therewith relative to said filter element.

7. The improvement as defined in claim 1 wherein said cleaning element is stationarily mounted within the inlet chamber of the valve, and said filter element is coupled with the diaphragm for movement therewith relative to said cleaning element.

8. The improvement as defined in claim 1 wherein said filter element comprises a generally cylindrical and relatively rigid filter sleeve having a plurality of relatively small filter openings formed therein, and means for supporting said filter sleeve with respect to said cleaning element.

9. The improvement as defined in claim 8 wherein said filter openings in said filter sleeve are each formed generally to have a cross section diverging in the direction of fluid flow.

10. The improvement as defined in claim 8 wherein said support means comprises a filter support for reception into said filter sleeve, and means for retaining said filter sleeve upon said filter support.

11. The improvement as defined in claim 10 wherein said filter support comprises a plurality of generally parallel posts spaced from each other to define a flow path generally between said posts.

12. The improvement as defined in claim 1 wherein said cleaning element comprises a mounting cylinder, means for securing said mounting cylinder for positioning said cleaning element with respect to said filter element, and said at least one scraper blade arm comprising a plurality of spring arms extending axially from said mounting cylinder and together surrounding said filter element, said at least one scraper blade comprising a scraper blade at the distal end of each of said spring arms for scraping engagement with said filter element each time the valve is opened or closed.

13. The improvement as defined in claim 12 wherein each of said scraper blades is sized for engagement with said filter element to deflect its associated spring arm at least slightly away from said filter element in a radial direction, whereby said spring arms each apply a spring force to their associated scraper blade urging said blade into scraping engagement with said filter element.

14. The improvement as defined in claim 12 wherein said spring arms are radially spaced from each other adjacent said mounting cylinder, and wherein said securing means comprises a mounting boss receivable into said mounting cylinder, a washer including radial legs receivable into the spaces between said spring arms, and means for connecting said washer to said mounting boss.

15. A solenoid-actuated valve comprising:
a valve housing having an inlet chamber and an outlet chamber;
a valve member disposed between said inlet and outlet chambers and movable between open and closed positions whereby fluid in said inlet chamber respectively communicates with said outlet chamber or is blocked from said outlet chamber;
a pressure-operated diaphragm coupled with said valve member and operable to move said valve member between said open position and said closed position;
a control chamber in fluid pressure communication with said diaphragm and adapted to receive pressurized fluid therein;
passageway means for admitting fluid from said inlet chamber to said control chamber;
a solenoid for controlling the pressure of fluid in said control chamber, said solenoid in one condition permitting said pressure in said control chamber to substantially equal the fluid pressure in said inlet chamber and to act on said diaphragm to hold said valve member in said closed position, and in another condition relieving said pressure in said control chamber sufficiently to permit movement to said diaphragm to open said valve member; and
a self-cleaning filter assembly disposed in said inlet chamber for filtering said fluid admitted to said control chamber through said passageway means, said assembly comprising a filter element for filtering said fluid and a cleaning element including at least one scraper blade and scraper blade arm having sufficient deflection for biasing said at least one scraper blade into scraping engagement with said filter element, said cleaning element, and said filter element being movable one relative to the other, and one of said cleaning element and said filter element being coupled for movement with said valve member so that said scraper blade scrapes said filter element each time said valve member moves between the open and closed positions.

16. The valve as defined in claim 15 wherein the deleterious filtered matter removed from said filter element is carried out of the valve from the inlet chamber to the outlet chamber by normal flow through the valve when the valve is in the open position.

17. The valve as defined in claim 15 wherein said at least one scraper blade comprises a plurality of scraper blades together substantially surrounding said filter element.

18. The valve as defined in claim 15 wherein said filter element is stationarily mounted within the inlet chamber of the valve, and said cleaning element is coupled with the diaphragm for movement therewith relative to said filter element.

19. The valve as defined in claim 15 wherein said cleaning element is stationarily mounted within the inlet chamber of the valve, and said filter element is coupled with the diaphragm for movement therewith relative to said cleaning element.

20. The valve as defined in claim 15 wherein said filter element comprises a generally cylindrical and relatively rigid filter sleeve having a plurality of relatively small filter openings formed therein, and means for supporting said filter sleeve with respect to said cleaning element.

21. The valve as defined in claim 20 wherein said filter openings in said filter sleeve are each formed generally to have a cross section diverging in the direction of fluid flow.

22. The valve as defined in claim 20 wherein said support means comprises a filter support for reception into said filter sleeve, and means for retaining said filter sleeve upon said filter support.

23. The valve as defined in claim 22 wherein said filter support comprises a plurality of generally parallel posts spaced from each other to define a flow path generally between said posts.

24. The valve as defined in claim 15 wherein said cleaning element comprises a mounting cylinder, means for securing said mounting cylinder for positioning said cleaning element with respect to said filter element, and said at least one scraper blade arm comprising a plurality of spring arms extending axially from said mounting cylinder and together surrounding said filter element, said at least one scraper blade comprising a scraper blade at the distal end of each of said spring arms for scraping engagement with said filter element each time the valve is opened or closed.

25. The valve as defined in claim 24 wherein each of said scraper blades is sized for engagement with said filter element to deflect its associated spring arm at least slightly away from said filter element in a radial direction, whereby said spring arms each apply a spring force to their associated scraper blade urging said blade into scraping engagement with said filter element.

26. The valve as defined in claim 24 wherein said spring arms are radially spaced from each other adjacent said mounting cylinder, and wherein said securing means comprises a mounting boss receivable into said mounting cylinder, a washer including radial legs receivable into the spaces between said spring arms, and means for connecting said washer to said mounting boss.

27. In a valve having an inlet chamber, an outlet chamber, a valve member movable to open and close fluid flow between said inlet and outlet chambers, a diaphragm carrying said valve member and responsive to fluid pressure in a control chamber for movably positioning said valve member between open and closed fluid flow positions, and pilot means for controlling fluid pressure within said control chamber, said pilot means including passage means for bleeding a portion of the fluid at said inlet chamber to said control chamber, a self-cleaning filter assembly, comprising:
a filter element mounted within said inlet chamber for passage of the portion of the fluid thereof to said passage means; and
a cleaning element substantially surrounding said filter element and including at least one scraper blade in scraping engagement with said filter element, and scraper blade arm having sufficient deflection for urging and maintaining said at least one scraper blade in scraping engagement with said filter element;

said cleaning element and said filter element being movable relative to each other, one of said cleaning element and said filter element being mounted for movement with said valve member to translate said filter element and said at least one scraper blade with respect to each other whereby said scraper blade removes accumulated filtered matter from said filter element.

28. The filter assembly of claim 27 wherein said filter element comprises a generally cylindrical and relatively rigid filter sleeve having a plurality of relatively small filter openings formed therein, and means for supporting said filter sleeve with respect to said cleaning element.

29. The filter assembly of claim 28 wherein said filter openings in said filter sleeve are each formed generally to have a cross section diverging in the direction of fluid flow.

30. The filter assembly of claim 27 wherein said cleaning element comprises a mounting cylinder, and means for securing said mounting cylinder for positioning said cleaning element with respect to said filter element, said at least one scraper blade arm comprising a plurality of spring arms extending axially from said mounting cylinder and together surrounding said filter element, said at least one scraper blade comprising a scraper blade at the distal end of each of said spring arms for scraping engagement with said filter element each time the valve is opened or closed.

31. The filter assembly of claim 3 wherein each of said scraper blades is sized for engagement with said filter element to deflect its associated spring arm at least slightly away from said filter element in a radial direction, whereby said spring arms each apply a spring force to their associated scraper blade urging said blade into scraping engagement with said filter element.

32. In a valve including an inlet chamber, an outlet chamber, a valve member movable to open and close fluid flow between said inlet and outlet chambers, a control chamber, pivot valve means for controlling the fluid pressure within said control chamber, said pilot valve means including passage means for bleeding a portion of fluid at the inlet chamber to said control chamber, a filter assembly for filtering the portion of fluid flowing into said passage means, comprising:

a filter element mounted within said inlet chamber for passage of the portion of the fluid thereof to said passage means; and a cleaning element substantially surrounding said filter element and including a plurality of scraper blades each in scraping engagement with said filter element and together substantially surrounding said filter element, and a corresponding plurality of scraper blade arms having sufficient deflection for urging and maintaining respective ones of said scraper blades in scraping engagement with said filter element;

said cleaning element and said filter element being movable relative to each other, one of said cleaning element and said filter element being mounted for movement with said valve member to translate said filter element and said scraper blades with respect to each other whereby said scraper blades remove accumulated filtered matter from said filter element.

33. The filter assembly of claim 32 wherein said filter element comprises a generally cylindrical and relatively rigid filter sleeve having a plurality of relatively small filter openings formed therein, and means for supporting said filter sleeve with respect to said cleaning element.

34. The filter assembly of claim 33 wherein said filter openings in said filter sleeve are each formed generally to have a cross section diverging in the direction of fluid flow.

35. The filter assembly of claim 32 wherein said cleaning element comprises a mounting cylinder, and means for securing said mounting cylinder for positioning said cleaning element with respect to said filter element, said scraper blade arms comprising a plurality of spring arms extending axially from said mounting cylinder and together surrounding said filter element, said at least one scraper blade comprising a scraper blade at the distal end of each of said springs for scraping engagement with said filter element each time the valve is opened or closed.

36. The filter assembly of claim 35 wherein each of said scraper blades is sized for engagement with said filter element to deflect its associated spring arm at least slightly away from said filter element in a radial direction, whereby said spring arms each apply a spring force to their associated scraper blade urging said blade into scraping engagement with said filter element.

* * * * *

UNITED STATES PATENT AND TRADEMARK OFFICE
CERTIFICATE OF CORRECTION

PATENT NO. : 4,360,037
DATED : November 23, 1982
INVENTOR(S) : Giles A. Kendall

It is certified that error appears in the above-identified patent and that said Letters Patent is hereby corrected as shown below:

Claim 31, line 1, delete "3" and insert therefor --27--.

Signed and Sealed this

Fifteenth Day of March 1983

[SEAL]

Attest:

GERALD J. MOSSINGHOFF

Attesting Officer     Commissioner of Patents and Trademarks